No. 873,577. PATENTED DEC. 10, 1907.
F. MICK.
WAGON BRAKE.
APPLICATION FILED JUNE 13, 1907.
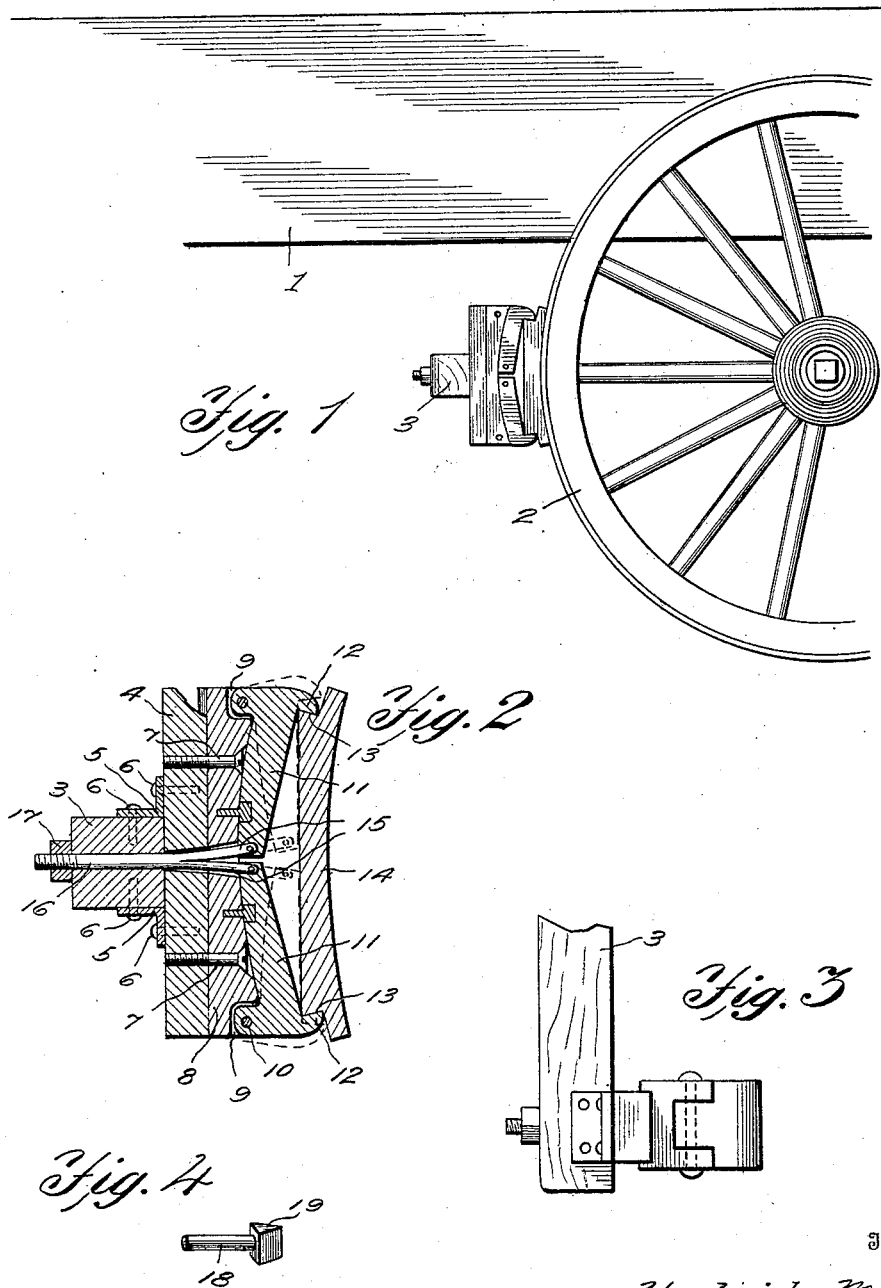
Inventor
Frederick Mick
Witnesses
By Victor J. Evans
Attorney

UNITED STATES PATENT OFFICE.

FREDERICK MICK, OF BILLINGS, MONTANA.

WAGON-BRAKE.

No. 873,577.  Specification of Letters Patent.  Patented Dec. 10, 1907.

Application filed June 13, 1907. Serial No. 378,853.

*To all whom it may concern:*

Be it known that I, FREDERICK MICK, a citizen of the United States of America, residing at Billings, in the county of Yellowstone and State of Montana, have invented new and useful Improvements in Wagon-Brakes, of which the following is a specification.

This invention relates to wagon brakes and one of the principal objects of the same is to provide means for detachably connecting the brake shoe to the brake so that a new brake shoe may be readily connected to the brake beam when the old shoe becomes worn or injured.

Another object of the invention is to provide a brake shoe holder comprising pivoted arms and a single operating bolt for moving said arms in position to release the shoe, or for holding the shoe in place.

These and other objects may be attained by means of the construction illustrated in the accompanying drawing, in which:

Figure 1 is a side elevation of a portion of a vehicle and wheel and showing a brake applied to the wheel, said brake being made in accordance with my invention. Fig. 2 is a central vertical section taken through the brake shoe holder. Fig. 3 is a top plan view of one end of the brake beam and showing the brake shoe holder and brake. Fig. 4 is a perspective view of one of the guide pins.

Referring to the drawing for a more particular description of my invention, the numeral 1 designates the body portion of a wagon or other vehicle and 2 is the wheel. The brake beam 3 which may be of the usual or any suitable construction and connected in any suitable way in front of the rear wheels of the vehicle, has connected to its outer ends a brake shoe holder comprising an outer plate or member 4 which is secured to the beam 3 by means of angle irons 5 and suitable fastenings 6. Connected by screws 7 to the outer plate or member 4 is a supporting member 8 provided with an inner curved surface and recessed ends 9. Pivoted in the recesses 9 upon the pins 10 are the brake shoe holding members 11, said members having curved outer surfaces to fit the curved surfaces of the member 8, and at the outer ends of said members 11 outwardly projecting lugs 12 are provided, said lugs adapted to engage shoulders 13 on the brake shoe 14. Connected to the inner ends of the members 11 are the arms 15 of a split bolt 16, said bolt passing through openings in the plates 8 and 4, and through the beam 3, and being fitted with a suitable nut 17 by means of which the members 11 may be moved to the dotted line position shown in Fig. 2 to permit the removal of the shoe 14, and by means of which the members 11 may be moved to the full line position shown in Fig. 2, to clamp said shoe between the projecting lugs 12. Guide pins 18 are connected to the plate or member 8, said guide pins having wedge shaped heads 19 which fit recesses in the members 11 to assist in holding said members in proper relative positions.

From the foregoing it will be obvious that a brake shoe holder made in accordance with my invention is of comparatively simple construction, can be quickly operated to disengage the shoe 14 for the purpose of renewing the same, and can be readily operated to clamp the shoe in place, the guide pins 18 serving to hold the members 11 in proper relative position.

Having thus described the invention, what I claim is:

1. A vehicle brake comprising a brake beam, a brake shoe holder secured thereto, said brake shoe holder comprising pivoted members, each having a projecting lug to engage the brake shoe, and a single split bolt pivotally connected to the inner ends of said members and extending through the beam.

2. A vehicle brake comprising a plate secured to the beam, a pair of brake shoe holders pivoted to said plate and provided with projecting lugs to engage a brake shoe, a split bolt connected to the inner ends of said shoe holding members, said bolt having a nut applied thereto at the outer surface of the beam, and guide pins secured to said plate and having heads which fit recesses in the shoe holding members.

3. In a vehicle brake, the combination of a plate having recesses in its outer ends, brake shoe holding members pivoted in said recesses and provided with projecting lugs to engage the brake shoe, a split bolt provided with arms pivotally connected to said shoe holding members, said bolt extending through the plate and beam, and provided with a nut for adjusting said shoe holding members.

In testimony whereof, I affix my signature in presence of two witnesses.

FREDERICK MICK.

Witnesses:
 ED CALVERT,
 WILLIAM ROBISON.